(12) United States Patent
Gao et al.

(10) Patent No.: US 10,733,042 B2
(45) Date of Patent: Aug. 4, 2020

(54) TECHNIQUES FOR HANDLING DRIVE ERRORS BASED ON EXTENTS CAUSING THE DRIVE ERRORS

(71) Applicant: EMC IP Holding Company LLC, Hopkinton, MA (US)

(72) Inventors: Hongpo Gao, Beijing (CN); Jamin Kang, Beijing (CN); Jian Gao, Beijing (CN); Ree Lei Sun, Beijing (CN); Shaoqin Gong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 197 days.

(21) Appl. No.: 15/848,580

(22) Filed: Dec. 20, 2017

(65) Prior Publication Data

US 2018/0210782 A1 Jul. 26, 2018

(30) Foreign Application Priority Data

Dec. 21, 2016 (CN) .......................... 2016 1 1194046

(51) Int. Cl.
| | |
|---|---|
| *G06F 11/00* | (2006.01) |
| *G06F 11/07* | (2006.01) |
| *G06F 3/06* | (2006.01) |
| *G06F 11/10* | (2006.01) |

(52) U.S. Cl.
CPC .......... *G06F 11/0793* (2013.01); *G06F 3/065* (2013.01); *G06F 3/0619* (2013.01); *G06F 3/0689* (2013.01); *G06F 11/079* (2013.01); *G06F 11/0727* (2013.01); *G06F 11/0754* (2013.01); *G06F 11/1088* (2013.01); *G06F 11/1092* (2013.01)

(58) Field of Classification Search
CPC .......................... G06F 11/1084; G06F 11/1092
See application file for complete search history.

(56) References Cited

U.S. PATENT DOCUMENTS

| | | | | |
|---|---|---|---|---|
| 7,653,840 | B1 * | 1/2010 | Taylor | G06F 11/0727 |
| | | | | 714/47.2 |
| 8,621,271 | B2 * | 12/2013 | Grube | G06F 3/0619 |
| | | | | 714/6.32 |
| 9,448,735 | B1 | 9/2016 | Proulx et al. | |
| 10,013,323 | B1 | 7/2018 | Puhov et al. | |
| 10,013,325 | B1 | 7/2018 | Garrett, Jr. et al. | |
| 10,095,585 | B1 | 10/2018 | Proulx | |
| 10,126,988 | B1 * | 11/2018 | Han | G06F 3/0604 |
| 10,140,041 | B1 * | 11/2018 | Dong | G06F 3/0619 |
| 10,146,447 | B1 * | 12/2018 | Dong | G06F 3/0613 |

(Continued)

Primary Examiner — Christopher S McCarthy
(74) Attorney, Agent, or Firm — BainwoodHuang (57) ABSTRACT

Implementations of the present disclosure relate to a method and apparatus for handling an error for a drive. The logic space of the drive is divided into a plurality of extents. The method comprises determining a type of errors in response to the errors detected in I/O operations for the drive. The method further comprises determining a drive extent of the plurality of extents of the drive that causes the errors in response to determining that the type of the errors is a soft medium error or a data error, the soft medium error being an error that can be repaired by re-mapping of a failed extent and the data error being an error that is caused by damage of data on the drive. Furthermore, the errors can be handled only with respect to the drive extent that causes the errors.

21 Claims, 7 Drawing Sheets

(56) References Cited

U.S. PATENT DOCUMENTS

| | | | |
|---|---|---|---|
| 10,146,624 B1 * | 12/2018 | Gong | G06F 11/1092 |
| 10,152,254 B1 | 12/2018 | Kang et al. | |
| 10,229,022 B1 * | 3/2019 | Gao | G06F 11/2041 |
| 10,235,082 B1 * | 3/2019 | Gao | G06F 3/0644 |
| 10,289,336 B1 * | 5/2019 | Liu | G06F 3/0647 |
| 10,346,247 B1 * | 7/2019 | Gao | |
| 10,402,249 B2 | 9/2019 | Xiao et al. | |
| 2003/0046497 A1 * | 3/2003 | Dandrea | G06F 11/1076 |
| | | | 711/154 |
| 2011/0231697 A1 * | 9/2011 | Berke | G06F 11/004 |
| | | | 714/3 |
| 2013/0346794 A1 * | 12/2013 | Bartlett | G06F 11/2094 |
| | | | 714/6.21 |
| 2017/0126255 A1 * | 5/2017 | Colgrove | G06F 11/1076 |
| 2019/0129815 A1 * | 5/2019 | Gao | G06F 11/1084 |

* cited by examiner

TECHNIQUES FOR HANDLING DRIVE ERRORS BASED ON EXTENTS CAUSING THE DRIVE ERRORS

RELATED APPLICATIONS

This application claim priority from Chinese Patent Application Number CN201611194046.7, filed on Dec. 21, 2016 at the State Intellectual Property Office, China, titled "A METHOD AND A DEVICE FOR HANDLING AN ERROR OF A DRIVE" the contents of which is herein incorporated by reference in its entirety.

FIELD

Embodiments of the present disclosure generally relate to the field of handling an error for a drive, and more specifically, to a method and apparatus for handling an error for a drive based on an extent of the drive.

BACKGROUND

When errors are detected in I/O operations for a drive, error handling is generally performed with respect to the entire drive. For instance, when drive errors are detected, the entire drive might be marked as "End of Life" (EOL) or as unavailable. In this case, the upper layer logic unit needs to reconstruct all data stored on the entire failed drive. As a result, error handling for the entire drive proves time-consuming and may reduce the service life of the drive and system stability significantly.

SUMMARY

To solve the above and other potential problems at least in part, embodiments of the present disclosure provide a method and apparatus for handling an error for a drive.

At a first aspect of the present disclosure, there is provided a method for handling an error for a drive. The logic space of the drive is divided into a plurality of extents. The method comprises determining a type of errors in response to the errors detected in I/O operations for the drive. The method further comprises determining a drive extent of the plurality of extents of the drive that causes the errors in response to determining that the type of the errors is a soft medium error or a data error, the soft medium error being an error that can be repaired by re-mapping of a failed extent and the data error being an error that is caused by damage of data on the drive. Furthermore, the method further comprises handling the errors only with respect to the drive extent that causes the errors.

At a second aspect of the present disclosure, there is provided an electronic device which comprises at least one processing unit and at least one memory. The at least one memory is coupled to the at least one processing unit and stores instructions executable by the at least one processing unit, the instructions, when executed by the at least one processing unit, causing the electronic device to perform acts of: in response to errors detected in I/O operations for a drive, determining a type of the errors, wherein a logic space of the drive is divided into a plurality of extents; in response to determining that the type of the errors is a soft medium error or a data error, determining a drive extent of the plurality of extents of the drive that causes the errors, the soft medium error being an error that can be repaired by re-mapping of a failed extent and the data error being an error that is caused by damage of data on the drive; and handling the errors only with respect to the drive extent that causes the errors.

At a third aspect of the present disclosure, there is provided a computer program product being tangibly stored on a non-transient computer-readable medium and comprising machine executable instructions which, when executed, cause a machine to perform any steps of the method described according to the first aspect of the present disclosure.

Through the following depiction, it is to be understood that the advantages of embodiments of the present disclosure are: by handling errors only with respect to the drive extent that causes the errors, the amount of data to be duplicated or reconstructed can be reduced, thereby reducing the resources and time required for handling the errors. By firstly marking the drive extent that causes the errors as unavailable, the failed drive extent can be prevented from exposing more errors, thereby consuming less spare area on the drive. In this way, the service life of the drive can be lengthened. In addition, embodiments of the present disclosure can handle errors for the drive based on extent, which can reduce the density of system load and avoid frequent swapping out of the entire drive, thereby enhancing system stability.

This Summary is provided to introduce a selection of concepts that are further described below in the Detailed Description in a simplified form. This Summary is not intended to identify key features or essential features of the claimed subject matter, nor is it intended to be used to limit the scope of the claimed subject matter.

BRIEF DESCRIPTION OF THE DRAWINGS

The above and other objectives, features and advantages of the present disclosure will become more apparent from more detailed description of some embodiments of the present disclosure with reference to the accompanying drawings, in which the same reference symbols are used to indicate the same elements.

DETAILED DESCRIPTION OF EMBODIMENTS

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. Rather, those embodiments are provided for thorough and complete understanding of the present disclosure, and completely conveying the scope of the present disclosure to those skilled in the art.

The term "comprise" and its variations used in the present disclosure mean comprising in an open-ended sense, i.e. "include without limitation". Unless otherwise specified, the term "or" means "and/or". The term "based on" means "at least partially based on". The terms "one exemplary embodiment" and "one embodiment" represent "at least one embodiment"; the term "another embodiment" represents "at least one another embodiment". The terms "first", "second" and the like may refer to different or the same objects. Other explicit and implicit definitions might further be included in the following description.

In a conventional storage system, drive errors are usually handled on the basis of the entire drive, which is reasonable for a drive failure caused by a hardware issue (such as spindle motor damage, magnetic head failure, drive plate failure and so on). However, there are some error categories where an error just impacts a portion of a drive.

Figure 1:
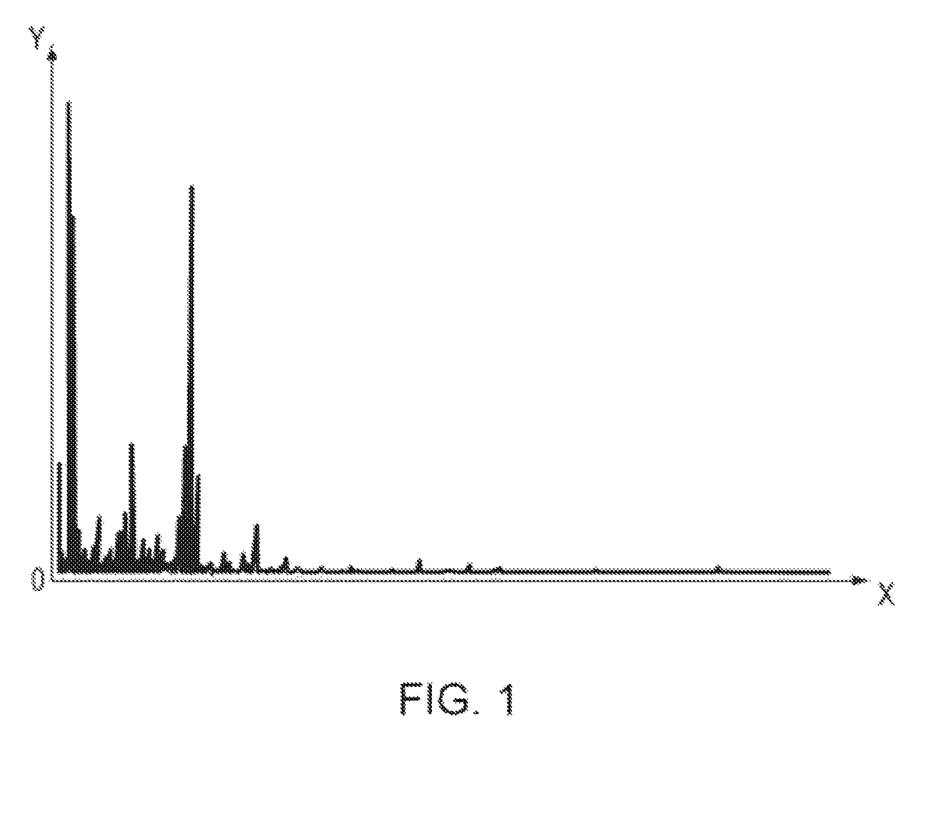
FIG. 1 illustrates a LBA (logic block address) distribution of failed extents on drives.

FIG. 1 illustrates a LBA (logic block address) distribution of failed extents on drives. FIG. 1 illustrates the distribution of bad sectors of drives, per data from thousands of drive arrays sold on the market and millions of drives in those arrays. FIG. 1 illustrates the spatial locality of drive errors. X-axis in FIG. 1 represents a logic address of a drive and Y-axis represents the number of errors. As shown in FIG. 1, the distribution of failed drive extents has a severe spatial locality. As can be seen from FIG. 1, majority of drive errors are exposed from some small areas of the drive.

Under this condition, the errors should be handled so that they affect a smaller drive area, rather than the whole drive. If some types of errors are not handled on the level of the drive extent, then a large amount of errors exposed from a small failed drive area would cause the drive to be marked as end of life or unavailable, which causes all the data in the entire drive to be impacted and need to be replicated or reconstructed.

Embodiments of the present disclosure can manage drive errors with drive extent granularity and perform acts on the drive extent causing the errors when the number of drive errors reaches a particular threshold while maintaining normal working of other drive extents from the same drive. By disabling the small failed extents before these failed drive extents expose more errors, embodiments of the present disclosure can save lots of spare blocks reserved by the drive, thereby lengthening the service life of the drive.

Figure 2:
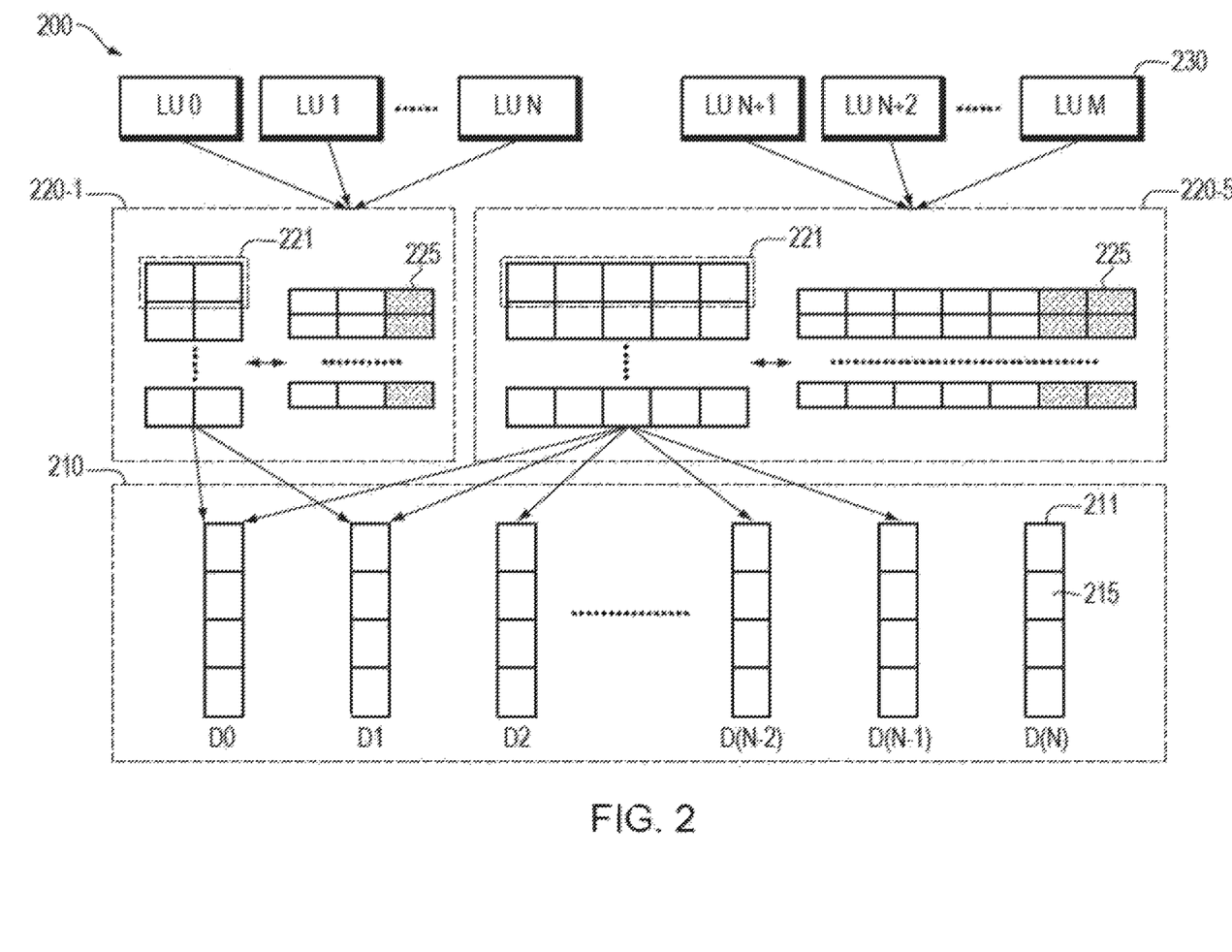
FIG. 2 illustrates a block diagram of a mapped RAID (redundant array of independent disks) architecture for handling an error for a drive in which embodiments of the present disclosure can be implemented.

FIG. 2 illustrates a block diagram of a mapped RAID (redundant array of independent disks) architecture 200 for handling an error for a drive in which embodiments of the present disclosure can be implemented. It should be understood that the structure and function of the mapped RAID architecture 200 are described only for example purpose instead of implying any limit to the scope of the present disclosure. The embodiments of the present disclosure can be embodied in different structures and/or functions. Moreover, though some embodiments of the present disclosure are described with a disk as an example, it is not to limit the scope of the present disclosure in any manner. The idea described herein can be applied to any storage device currently known or to be developed in the future.

As shown in FIG. 2, the mapped RAID architecture 200 can include a drive pool 210, a mapped RAID group consisting of mapped RAID 220-1 of R1 type and mapped RAID 220-5 of R5 type etc., and a logic unit (LU) 230.

The mapped RAID is a drive-level virtualization technology. However, in the mapped RAID architecture 200 shown in FIG. 2, the object of RAID algorithm operation is a drive extent rather than the entire drive. Specifically, a drive 211 will be added into the drive pool 210. For example, the drive 211 may be a disk. Drives in the same drive pool 210 will be marked with a same drive pool ID. After system setup, the drive pool 210 will manage the drives belong to it. In the drive pool 210, each drive is marked by its respective drive ID, for example, drives D0, D1, D2, D(N−2), D(N−1), D(N) and so on. The logic space of each drive is split into a plurality of small areas. The drive pool 210 manages those small areas with an internal tracking object—a drive extent 215. A plurality of drive extents may have the same dimension. For example, each drive extent 215 is defined as 256 MB.

The drive pool 210 is logically constituted by drive extents 215 residing on a cluster of drives 211. The drive pool 210 manages and maintains: a drive mapping table representing a mapping between the drive extent 215 and the drive 211 to record which drive extents belong to which drive; and a drive extent state to describe a state of a drive extent (if available, consumed, available, end of life (EOL) or unavailable etc.). By way of example, Table 1 below shows several states of the drive extent

TABLE 1

| Drive extent state | Description |
| --- | --- |
| consumed | indicate that the drive extent has been used by mapped RAID |
| available | indicate that the drive extent is healthy, can be used by mapped RAID and not in use yet. |
| end of life (EOL) | indicate that spare blocks of the drive extent have been used up |
| unavailable | indicate that the drive extent has failure and cannot be used any more |

In addition, the drive pool 210 further manages and maintains: a drive state, including: if a drive is removed temporarily, if a drive is removed permanently, if a drive is marked as EOL, unavailable and so on.

The drive pool 210 can make a response to an allocating/releasing request for the drive extent initiated by the mapped RAID. The drive pool 210 tracks a state of a drive extent on each drive 211 to facilitate allocating operation of the drive extent and makes a quick response to a state change event of a drive extent, such as end of life, available or unavailable etc. For example, the drive pool 210 identifies if some drive extent is consumed or not. If the drive extent is consumed, it is recorded which RAID extent consumes it. The drive pool 210 identifies if a drive extent 215 is marked as EOL or unavailable. Suppose that a drive is marked as unavailable, the drive pool 210 will receive a state change event for the drive. Then, the drive pool 210 will update the state of drive extents belonging to the failed drive. If a drive extent consumed by the mapped RAID group is marked as unavailable, the drive pool 210 will select a new drive extent to replace the failed drive extent.

As stated above, the drive pool 210 makes a response to a drive extent allocating request from the mapped RAID group. The drive extent allocating strategy should follow basic rules: drive extents 215 mapped into the same RAID extent should reside on different drives, and the allocating strategy should balance drive extent consumption across all the drives in the same mapped RAID group (e.g., including mapped RAID 220-1 of R1 type and mapped RAID 220-5 of R5 type etc.). Furthermore, the spare block strategy check is embedded into the drive extent allocation of the drive pool 210.

Furthermore, the drive pool 210 responds to a request for adding a new drive into the drive pool—drive pool expansion. The drive pool 210 responds to a drive state change event, including: drive unavailable setting, drive EOL setting, drive timeout setting and the like. For example, when a drive has failure, and is hence marked as EOL or unavailable, the drive pool 210 would notify the corresponding/affected mapped RAID group to trigger the mapped RAID group to handle the error.

RAID algorithms here are the same as the drive-level algorithms. However, the object manipulated by RAID algorithms is changed from the entire drive to a portion of a drive. When a RAID group is established, the mapped RAID group will make use of the drive pool 210 to allocate drive extents. The mapped RAID 220-1 of R1 type in the mapped RAID group represents 1+1 mapped RAID and the mapped RAID 220-5 of R5 type in the mapped RAID group represents 4+1 mapped RAID. Specifically, each RAID extent 221 (represented as "row") in the mapped RAID 220-1 of R1 type is mapped to two drive extents from two different drives, respectively, one of the two drive extents storing a duplicate of data of the other drive extent for reconstructing data of the other drive extent when the other drive extent fails. For example, a RAID extent 221 in the mapped RAID 220-1 of R1 type may be mapped to drive extents on drives D0 and D1, where the drive extent on drive D1 stores a duplicate of data of the drive extent on the drive D0.

Each RAID extent 221 (represented as "row") in the mapped RAID 220-5 of R5 type is mapped to five drive extents from five different drives, respectively, one of which storing a XOR value of data of the other four drive extents for reconstructing data of the failed drive extent when one of the other four drive extents has failure. For example, a RAID extent 221 in the mapped RAID 220-5 of R5 type may be mapped to drive extents on drives D0, D1, D2, D(N−2) and D(N−1), where the drive extent on the drive D(N−1) stores a XOR value of data on the drive extents of drives D0, D1, D2 and D(N−2). Each mapped RAID will maintain its own mapping table 225, each row of which describes how the mapped RAID extent 221 is mapped to drive extents. The mapping table 225 may facilitate translation (mapping) from a logic block address of the mapped RAID group to a physical block address of a drive.

The conventional RAID group state may be tracked at RAID extent-level, for example, RAID extent status (namely, optimal, degraded, broken), failed drive extent, the reconstruction and duplication progress on each RAID extent.

The mapped RAID will be responsible for recovering data from a failed drive extent, which mainly relies on two mechanisms, reconstruction and duplication. If a drive extent can still function but spare blocks on the drive extent are close to be used up, the drive extent will be set as EOL, and then the mapped RAID will perform duplication—read data from the drive extent marked as EOL and duplicate the data to a further available drive extent for data recovery. If a drive extent is damaged permanently and cannot function, the mapped RAID will read data from the rest of drive extents in the same RAID extent as the failed drive extent, then reconstruct data via an XOR operation and write the reconstructed data into a further available drive extent to recover data from the failed drive extent. The above reconstruction and duplication mechanisms also apply to data recovery for the entire drive.

The reconstruction of mapped RAID is described in detail here. The mapped RAID architecture/design as shown in FIG. 2 is used. When a drive fails, all the consumed drive extents on the failed drive can be marked as unavailable after a waiting period, for instance, 5 minutes. Then the mapped RAID selects replacements for these consumed drive extents randomly on other drives in the drive pool 210. The only limitation for selecting drive extents is that it should be always guaranteed that the drive extents in one RAID extent must be allocated from different drives. Thus, in this manner, all the drives in the drive pool 210 will be involved in the reconstructing/rebuilding procedure. In the monitor condition context (one background service thread context), reconstruction will be performed on the RAID extent level. Each RAID extent 221 maintains its own reconstruction check point in the mapping table 225 to indicate the reconstruction progress thereon. When the reconstruction on one RAID extent is completed, mapped RAID will set the reconstruction check point to an end marker and store the mapping table item in drives.

The duplication of mapped RAID is described in detail here. When a drive extent is marked as EOL, proactive duplication will be triggered. Duplication operation for a particular source drive extent can be triggered without a specified destination drive extent pointed out by the mapped RAID. When duplication from a drive extent is initiated, mapped RAID will select a spare drive extent for the source drive extent. Then, the mapped RAID group will start duplication on background. If it is user duplication, when duplication for the source drive extent is completed, the source drive extent will not be used and be marked as available and returned to the drive pool 210. If it is a proactive duplication, the drive extent and/or drive will be marked as EOL (and removed from the mapped RAID). The duplication progress is tracked at the RAID extent level.

On the upper layer of the mapped RAID group including the mapped RAID 220-1 of R1 type and the mapped RAID 220-5 of R5 type etc., there is configured a logic unit 230. The logic unit 230 performs various functions for an application by means of the mapped RAID group.

In the mapped RAID architecture 200 shown in FIG. 2, the logic space of the drive 211 is divided into a plurality of drive extents 215. Thus, in embodiments of the present disclosure, drives can be managed in a drive extent granularity.

Figure 3:
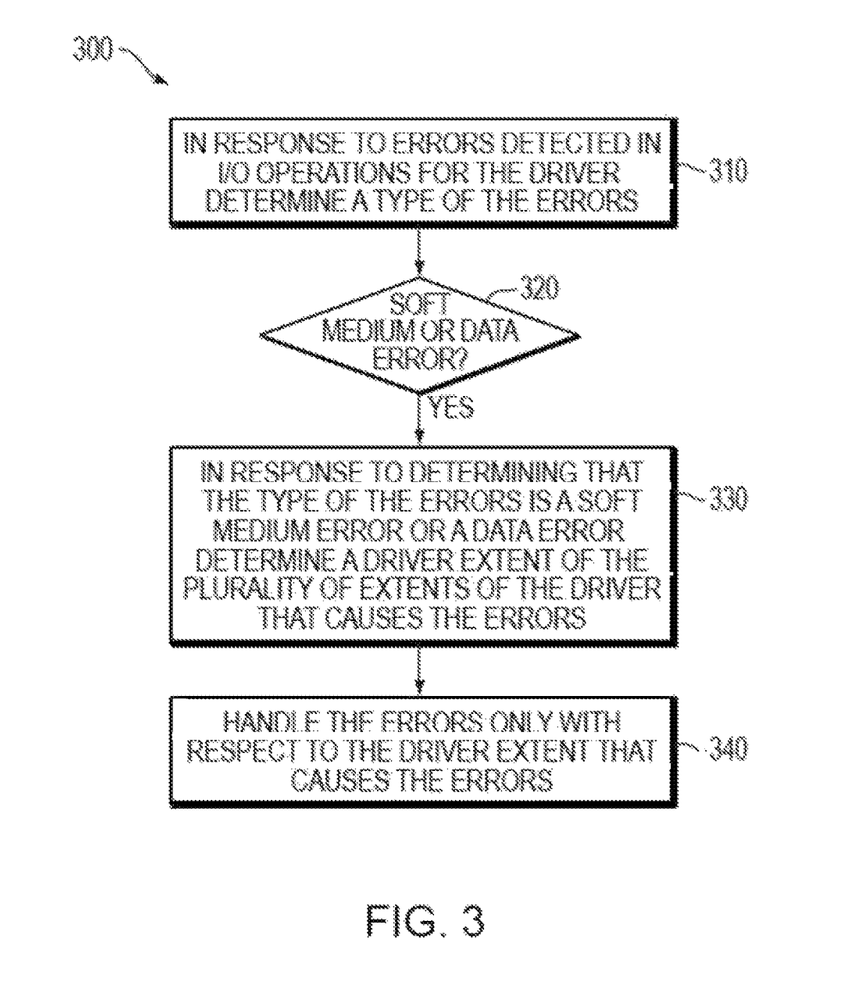
FIG. 3 illustrates a flowchart of a method for handling an error for a drive according to an embodiment of the present disclosure.

Several example embodiments of the present disclosure will be described in greater detail with reference to FIGS. 3-7 in the following. FIG. 3 illustrates a flowchart of a method 300 for handling an error for a drive according to an embodiment of the present disclosure. For example, the method 300 can be implemented by the logic unit 230 shown in FIG. 2. It is to be understood that the method 300 may further include additional acts not shown and/or omit some acts as shown. The scope of the present disclosure is not limited in this regard.

At 310, the logic unit 230 determines a type of errors in response to the errors detected in I/O operations for a drive 211. When receiving I/O operations for the drive, the logic unit 230 checks the I/O status. If the errors are returned, the logic unit 230 determines the type of the errors based on the returned status.

For example, in the storage system, it is possible to report many kinds of errors for the drive. It is realized by inventors that all the possible drive errors may be divided into several categories. For example, the drive error may be a hard medium error that is hard to recover or a soft medium error that is easier to be repaired. The main difference between the error categories is how hard the software will recover the error. This means that a severe hard medium error is hard to recover and may cause the drive to be marked as unavailable soon (and removed from the drive pool 210). Compared with the hard medium error, a soft medium error is not so severe. The error handling mechanism according to the present disclosure handles drive errors per error type separately.

In some embodiments of the present disclosure, drive errors may be roughly divided into three types: hard medium error, soft medium error and data error. As an example, the error types can be divided based on SCSI (small computer system interface) codes. Table 2 below shows an annotation for the three types of errors.

TABLE 2

| Type of drive errors | Description |
| --- | --- |
| Hard medium error | Hard medium error refers to an error caused by failure of a hardware (such as spindle motor, magnetic head, drive plate, link and so on) in a drive; Hard medium error further includes a link error which indicates a link between a drive and a port fails; Hard medium error will cause a drive to try to recover itself through resetting very soon or be marked as EOL or unavailable when the drive cannot recover. |
| Soft medium error | Soft medium error refers to an error that can be repaired by re-mapping of the failed portion; Re-mapping includes re-mapping the failed portion physically to a spare block reserved by the drive manufacturer but the drive will keep the logic address of the re-mapped spare block identical to that of the failed portion. |
| Data error | Data error refers to an error caused by damage of data on the drive. |

The error classifications are different from each other by the order of severity. For example, less severe soft medium error can be repaired by the spare blocks reserved in the drive medium. Therefore, soft medium error will only be accumulated. Only when the count or ratio of the soft medium error reaches a threshold, an act will be taken by the upper logic unit 230. In comparison, more severe hard medium error may cause the drive to be marked as EOL or unavailable quickly (its count or ratio has a small corresponding threshold).

In some embodiments of the present disclosure, in the case that the type of drive errors is determined as hard medium error, the logic unit 230 will handle errors at the entire drive level. In the case that it is determined that the type of drive errors is soft medium error or data error, the logic unit 230 will handle errors at the drive extent level.

At 320, the logic unit 230 determines if the type of errors is a soft medium error or a data error.

At 330, in response to determining that the type of the errors is a soft medium error or a data error, the logic unit 230 determines a drive extent 215 of the plurality of extents of the drive 211 that causes the errors.

At 340, the logic unit 230 handles the errors only with respect to the drive extent 215 that causes the errors. For example, in some implementations, at 340, a number of the errors and a number of the I/O operations may be counted respectively. Then, a ratio of the number of the errors to the number of the I/O operations can be calculated and the errors are handled on the basis of this ratio.

In such an implementation, logic unit 230 defines the type of errors and records an error tag for each type of errors to facilitate counting the errors. For each type of errors, the logic unit 230 defines different error thresholds. When the count of accumulated errors exceeds the corresponding threshold, the logic unit 230 will take a relevant action. The drive pool 210 may maintain an error counter for each drive extent 215. When the count of the error counter exceeds a particular threshold, it is the drive extent 215 rather than the entire drive 211 that is marked as EOL or unavailable. Table 3 below shows an example of fields used in calculating the ratio of the errors.

TABLE 3

| Field | Description |
| --- | --- |
| Io_counter | record a number of I/O operations for a drive |
| Soft_media_error_tag | record a number of soft medium errors |
| Hard_media_error_tag | record a number of hard medium errors |
| Data_error_tag | identify a data error |
| error_tag | a number of errors in a general sense |
| error_ratio | represent a ratio of errors |
| interval | defined to make the ratio of errors smaller, even zero |

Figure 4:
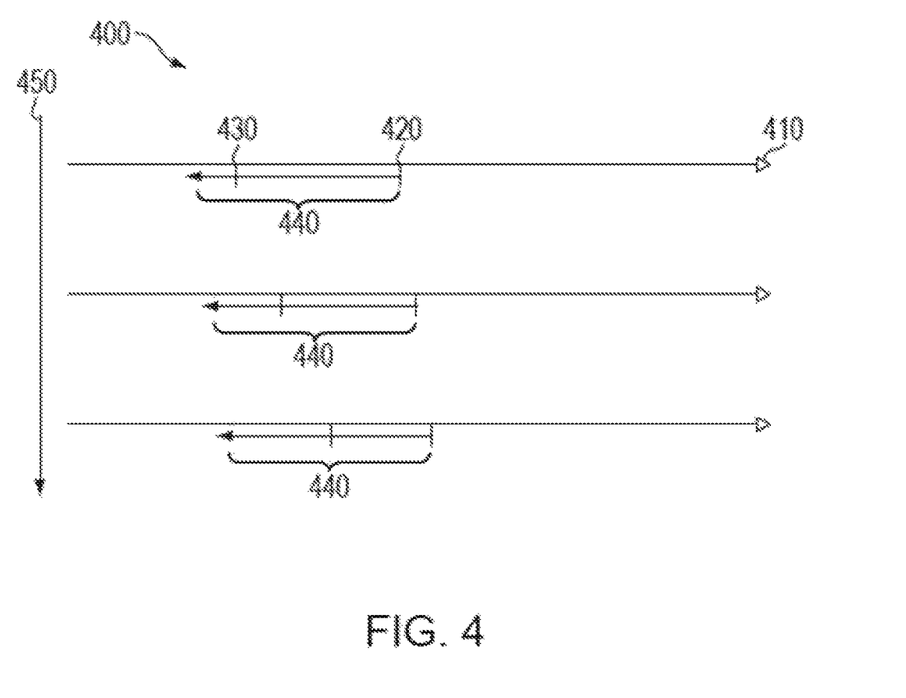
FIG. 4 illustrates a schematic diagram of a method for calculating a ratio of errors according to an embodiment of the present disclosure.

FIG. 4 illustrates a schematic diagram of a method 400 for calculating a ratio of errors according to an embodiment of the present disclosure. The three horizontal axes 410 shown in FIG. 4 indicate a number of I/O operations changing over time. The rightmost positions 420 on the horizontal axes 410 indicate a total number of current I/O operations, namely, the value of Io_counter 420 which is configured with a high initial value, such as one million. The middle positions 430 on the horizontal axes 410 indicate the number of I/O operations with errors, namely, the value of the number of errors error_tag 430, such as the value of the number of soft medium errors Soft_media_error_tag. The vertical axis 450 in FIG. 4 shows that time increases downward. It can be seen from FIG. 4 that with the evolution of time represented by the vertical axis 450, both the total number of I/O operations Io_counter 420 and the number of errors error_tag 430 on the horizontal axes 410 move in the right direction (namely, increase). FIG. 4 further illustrates interval 440. For example, the value of interval may be 10,000. As shown in FIG. 4, the initial value of error_tag=Io_counter−interval. For each occurrence of an error, error_tag+=1.

For instance, the ratio of errors can be calculated by:

$$error\_ratio=(1-(Io\_counter-error\_tag)/interval)*100 \quad (1)$$

In some implementations, the number of the errors is counted based on weights for the errors, where weights for different types of errors are set with different values. To obtain the current number of errors error_tag for each type of errors, weights for different types of errors can be defined. A weight may describe the severity of an error. The bigger the weight value is, the severer the error is, and the faster the drive or drive extent tries to be reset or marked as EOL/unavailable. For example, for a hard medium error, the weight may have the maximum value. For instance, the value of weight may be 100, 200 or 1000. Under consideration of the weight, error_tag+=1*weight.

In some implementations, if the errors bursts or does not impact a normal I/O operation for the drive, weights can be reduced. In the case of bursts of errors in a very short time, weights can be reduced, which may prevent prematurely taking actions for errors due to transient instability of the system, thereby improving system stability. The logic unit 230 may configure the time interval between errors which may be considered as a burst. Furthermore, for some errors that do not impact a normal I/O operation for the drive, weights can be reduced, thereby preventing taking actions prematurely for less severe errors.

When the first error is found, Io_counter 420 is initialized as an initial value, for example, one million, and error_tag 430 is initialized as Io_counter−interval, where interval, for example, is equal to 10,000. If there are bursts of errors, weights may be reduced and used to calculate the number of errors error_tag. Then, error_ratio can be obtained with error_tag.

As can be known from the above equation (1), if no more errors occur after the first error occurred, error_tag stays constant while Io_counter keeps increasing. Hence, error_ratio will decrease, even close to 0. On the contrary, if the number of errors increases gradually, error_ratio will reach a threshold. Then the logic unit 230 will perform the predefined actions.

In some implementations, the logic unit 230 compares the ratio of soft medium errors with a threshold. The logic unit 230 may define various thresholds to determine which actions to be taken, such as a shutdown threshold, a life threshold and a resetting threshold. In response to the ratio of the soft medium errors being greater than the shutdown threshold, the logic unit 230 may mark the drive extent 215 as unavailable. In response to the ratio of the soft medium errors being smaller than the shutdown threshold but greater than the life threshold, the logic unit 230 may mark the drive extent 215 as end of life (EOL). In response to the ratio of the soft medium errors being smaller than the life threshold but greater than the resetting threshold, the logic unit 230 may reset an entirety of the drive 211 to which the drive extent 215 belongs.

In some implementations, in response to the drive extent 215 being marked as end of life, the logic unit 230 may duplicate data from the drive extent 215 to a further drive extent and replace the drive extent 215 with the further drive extent. Alternatively, in response to the drive extent 215 being marked as unavailable, the logic unit 230 may reconstruct, on a further drive extent, data that is identical to data on the drive extent 215 and replace the drive extent 215 with the further drive extent. The failed drive extent 215 that is marked as EOL or unavailable will be removed from the mapped RAID group and/or drive pool 210. The further drive extent will be added into the mapped RAID group.

In some embodiments of the present disclosure, not all the types of errors are used to be tracked at the entire drive level. For hard medium errors (including link errors), it is usually the issues of the entire drive and still errors are recorded and an error ratio is calculated at the entire drive. However, for soft medium errors and data errors, error handling will be limited to the scope of the drive extent.

Figure 5:
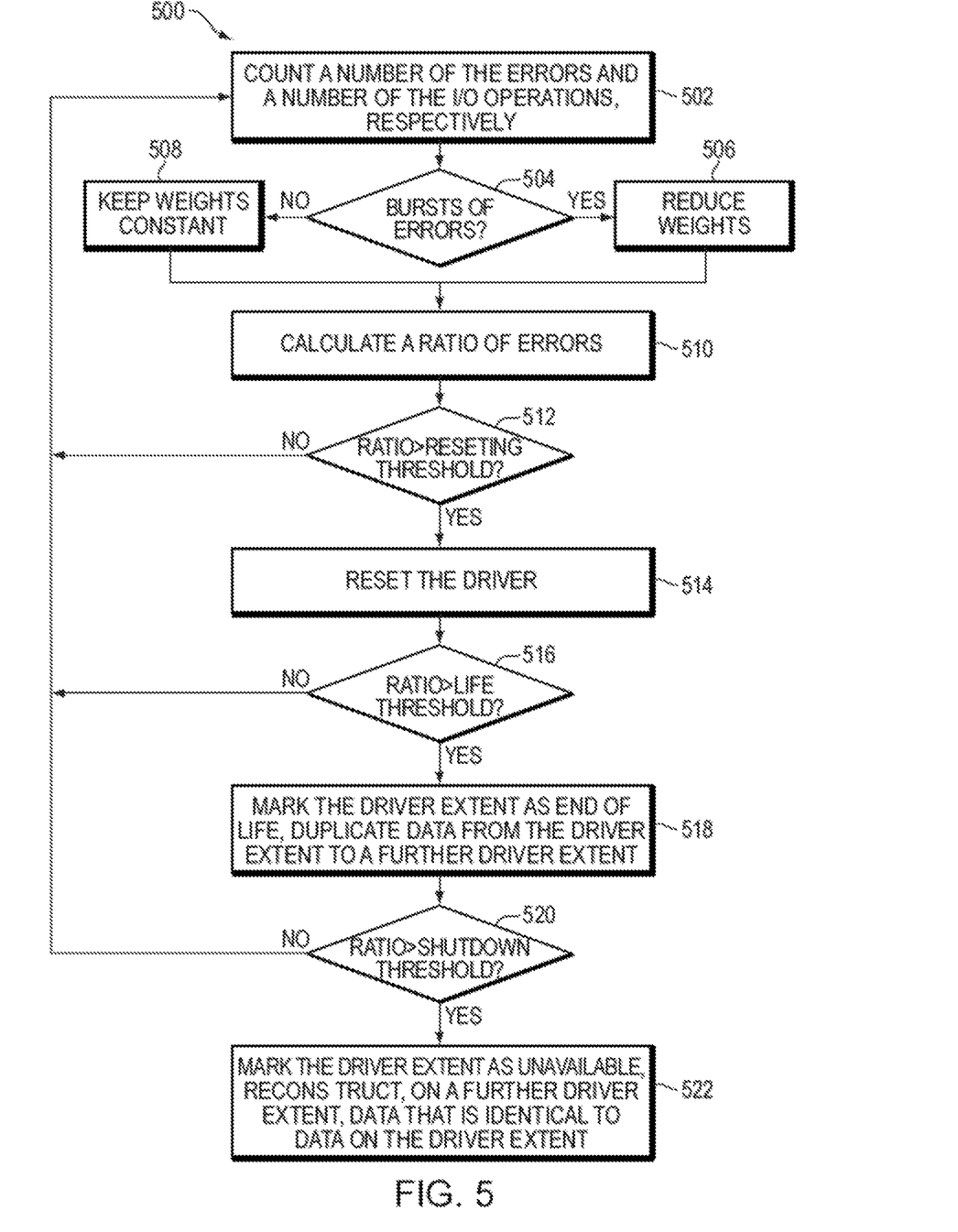
FIG. 5 illustrates a flowchart of a method for handling errors only with respect to a drive extent according to an embodiment of the present disclosure.

FIG. 5 illustrates a flowchart of a method 500 for handling errors only with respect to a drive extent according to an embodiment of the present disclosure. For example, the method 500 is an example implementation of block 340 in the method 300 described above and it can be implemented by the logic unit 230 shown in FIG. 2. In other words, now the logic unit 230 has determined that the type of the errors is a soft medium error, and has found the drive extent 215 that causes the errors. It should be understood that the method 500 may further include additional acts that are not shown and/or omit some acts as shown. The scope of the present disclosure is not limited in this regard.

At 502, the logic unit 230 counts a number of errors and a number of I/O operations respectively. Specifically, for each drive extent, in response to detecting a soft medium error, the logic unit 230 updates the value of total number Io_counter of the I/O operations and updates the value of the number error_tag of errors according to the error type. At 504, the logic unit 230 determines if there are bursts of the errors. In the case of bursts of the errors, the method 500 moves to 506 where the logic unit 230 reduces weight for this type of errors. If there are no bursts of the errors, the method 500 comes to 508 where the logic unit 230 keeps the weight for this type of errors constant. At 510, the logic unit 230 calculates the error ratio based on the number of errors error_tag under consideration of weights.

According to the severity level of the errors, the logic unit 230 can define several types of error thresholds, three of which are a resetting threshold, a life threshold and a shutdown threshold. The life threshold is greater than the resetting threshold and smaller than the shutdown threshold. It is noted that the specific values of the resetting, life and shutdown thresholds are not discussed herein, may vary depending on the drive technology, type and module, and even should be defined differently for drives from different drive vendors.

At 512, the logic unit 230 compares the calculated ratio with a predefined resetting threshold. If the calculated ratio is greater than the resetting threshold, the method 500 comes to 514 where the logic unit 230 resets an entirety of the drive 211 to which the drive extent 215 causing errors belongs. Resetting is not applicable to a drive extent because the current drive technology does not yet support resetting a portion of the logic space of the drive. If resetting the drive can recover the errors, the system will continue to work. If the calculated ratio is not greater than the resetting threshold, the method 500 returns to 502 in which the number of errors and the number of I/O operations are recounted respectively, thereby accumulating the number of errors. Subsequently, the ratio of errors is recalculated at 510.

If resetting at 514 does not work, the ratio of errors will continue to increase. Then at 516, the logic unit 230 compares the calculated ratio with a predefined life threshold. If the calculated ratio is greater than the life threshold, the method 500 moves to 518 in which the logic unit 230 marks the drive extent 215 causing errors as end of life, which will trigger proactive duplication for the drive extent. The logic unit 230 duplicates data from the drive extent to a further drive extent and replaces the drive extent with the further drive extent. The drive extent causing errors will be swapped out from the mapped RAID. If the calculated ratio is not greater than the life threshold, the method 500 returns to 502 in which the number of errors and the number of I/O operations are recounted respectively, thereby accumulating the number of errors. Subsequently, the ratio of errors is recalculated at 510.

At 520, the logic unit 230 compares the calculated ratio with a predefined shutdown threshold. If the calculated ratio is greater than the shutdown threshold, the method 500 moves to 522 in which the logic unit 230 marks the drive extent 215 causing errors as unavailable. The logic unit 230 may reconstruct, on a further drive extent, data that is identical to data on the drive extent and replaces the drive extent with the further drive extent.

If the drive extent that causes the errors is consumed by the mapped RAID group, when the drive extent is marked as unavailable, the mapped RAID group will receive the drive extent state change event from the drive pool 210. The mapped RAID will mark the RAID extent 221 corresponding to the failed drive extent as in need of reconstruction. The drive pool 210 will select a new idle drive extent and allocate it to the mapped RAID extent 221. After the mapping information of the relevant RAID extent gets updated, the drive pool 210 will send a new drive extent ready event to the mapped RAID group. The mapped RAID group will mark the new drive extent as in need of reconstruction. The mapped RAID may reconstruct data by permanently swapping in the new good drive extent to replace the drive extent that causes the errors. The mapped RAID triggers reconstruction/rebuilt for data on the drive extent that causes the errors.

If the drive extent that causes the errors is not consumed by any mapped RAID group, the drive pool 210 will mark the drive extent as unavailable and the drive extent will not be allocated to any mapped RAID extent in the future.

If the calculated ratio is not greater than the shutdown threshold, the method 500 returns to 502 where the number of errors and the number of I/O operations are recounted respectively, thereby accumulating the number of errors. Subsequently, the ratio of errors is recalculated at 510.

In some implementations, in response to determining that the type of the errors is a hard medium error, the logic unit 230 handles the errors with respect to an entirety of the drive. The hard medium error is an error that is caused by a hardware failure in the drive.

In some implementations, the logic unit 230 handling the errors with respect to an entirety of the drive includes: counting a number of the errors and a number of the I/O operations respectively; calculating a ratio of the number of the errors to the number of the I/O operations; and handling the errors based on the ratio. The count and ratio calculation for the hard medium error are similar to those for the soft medium error described above, and thus omitted here.

In some implementations, the logic unit 230 compares the ratio of the hard medium errors with a threshold. In response to the ratio of the hard medium errors being greater than a shutdown threshold, the logic unit 230 marks the entire drive 211 as unavailable. In response to the ratio of the hard medium errors being smaller than the shutdown threshold but greater than a life threshold, the logic unit 230 marks the entire drive 211 as end of life. In response to the ratio of the hard medium errors being smaller than the life threshold but greater than a resetting threshold, the logic unit 230 resets the entire drive 211.

In some implementations, in response to the entire drive 211 being marked as end of life, the logic unit 230 may perform a duplication act for the entire drive 211 identical to that performed for the drive extent. In some implementations, in response to the entire drive 211 being marked as unavailable, the logic unit 230 may perform a reconstruction act for the entire drive 211 identical to that performed for the drive extent.

It should be noted that the various thresholds mentioned above are set with different values for different types of errors. The various thresholds for the ratio are a percentage ranging from 0% to 100%.

In some implementations, if the type of the errors is determined to be a data error, the logic unit 230 marks the drive extent 215 that causes the errors directly as unavailable without counting and accumulating the data errors. The drive extent 215 marked as unavailable will be removed from the mapped RAID group and replaced by a further spare drive extent.

Figure 6:
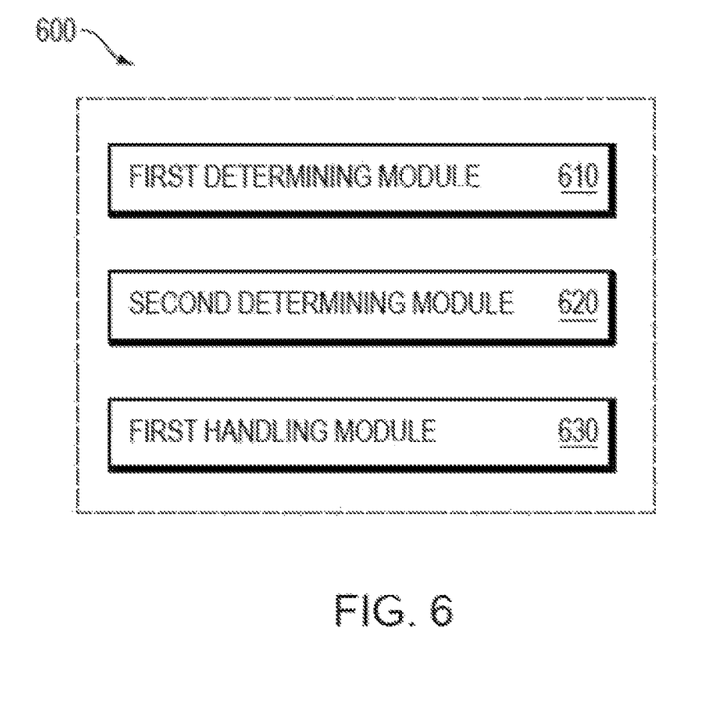
FIG. 6 illustrates a block diagram of an apparatus for handling an error for a drive according to an embodiment of the present disclosure.

FIG. 6 illustrates a block diagram of an apparatus 600 for handling an error for a drive according to an embodiment of the present disclosure. For example, the logic unit 230 can be implemented by the apparatus 600. As shown in FIG. 6, the apparatus 600 may include a first determining module 610 which is configured to determine a type of errors in response to the errors detected in I/O operations for a drive, wherein a logic space of the drive is divided into a plurality of extents. The apparatus 600 may further include a second determining module 620 which is configured to determine a drive extent of the plurality of extents of the drive that causes the errors in response to determining that the type of the errors is a soft medium error or a data error, wherein the soft medium error is an error that can be repaired by re-mapping of a failed extent and the data error is an error that is caused by damage of data on the drive. Furthermore, the apparatus 600 may further include a first handling module 630 which is configured to handle the errors only with respect to the drive extent that causes the errors.

In some implementations, the first handling module 630 includes: a first counting sub-module which is configured to count a number of the soft medium errors and a number of the I/O operations, respectively; a first calculating sub-module which is configured to calculate a ratio of the number of the soft medium errors to the number of the I/O operations; and a first handling sub-module which is configured to handle the soft medium errors based on the ratio.

In some implementations, the first handling sub-module includes: a first comparing unit which is configured to compare the ratio with a threshold; and a first handling unit which is configured to: in response to the ratio being larger than a shutdown threshold, mark the drive extent as unavailable; and in response to the ratio being smaller than the shutdown threshold but greater than a life threshold, mark the drive extent as end of life. The first handling unit may be further configured to reset an entirety of the drive in response to the ratio being smaller than the life threshold but greater than a resetting threshold.

In some implementations, the first handling sub-module further includes: a duplicating unit which is configured to: in response to the drive extent being marked as end of life, duplicate data from the drive extent to a further drive extent and replace the drive extent with the further drive extent; or a reconstructing unit which is configured to: in response to the drive extent being marked as unavailable, reconstruct, on a further drive extent, data that is identical to data on the drive extent and replace the drive extent with the further drive extent.

In some implementations, the apparatus 600 may further include a second handling module which is configured to handle the errors with respect to an entirety of the drive in response to determining that the type of the errors is a hard medium error, wherein the hard medium error is an error that is caused by a hardware failure in the drive.

In some implementations, the second handling module may include: a second counting sub-module which is configured to count a number of the hard medium errors and a number of the I/O operations, respectively; a second calculating sub-module which is configured to calculate a ratio of the number of the hard medium errors to the number of the I/O operations; and a second handling sub-module which is configured to handle the hard medium errors based on the ratio.

In some implementations, the second handling sub-module may include: a second comparing unit which is configured to compare the ratio with a threshold; and a second handling unit which is configured to: in response to the ratio being larger than a shutdown threshold, mark the entire drive as unavailable; and in response to the ratio being smaller than the shutdown threshold but greater than a life threshold, mark the entire drive as end of life; and in response to the ratio being smaller than the life threshold but greater than a resetting threshold, reset the entire drive.

In some implementations, counting the number of the errors is based on weights for the errors. The apparatus 600 may further include a weight reducing module which is configured to reduce the weights in response to bursts of the errors or in absence of an impact on a normal I/O operation for the drive by the errors.

In some implementations, the first handling module 630 may further include a third handling sub-module which is configured to mark the drive extent that causes the errors as unavailable if the type of the errors is determined to be a data error, without accumulating errors.

For the sake of clarity, some optional modules of the apparatus 600 are not shown in FIG. 6. However, it should be understood that various features as described with reference to FIGS. 2-5 are likewise applicable to the apparatus 600. Furthermore, various modules of the apparatus 600 may be hardware modules or software modules. For example, in some embodiments, the apparatus 600 may be partially or completely implemented using software and/or firmware, e.g., implemented as a computer program product embodied on a compute readable medium. Alternatively or additionally, the apparatus 600 may be partially or completely implemented based on hardware, for example, implemented as an integrated circuit (IC) chip, an application specific integrated circuit (ASIC), a system on chip (SOC), a field programmable gate array (FPGA) and so on. The scope of the present disclosure is not limited in this regard.

Figure 7:
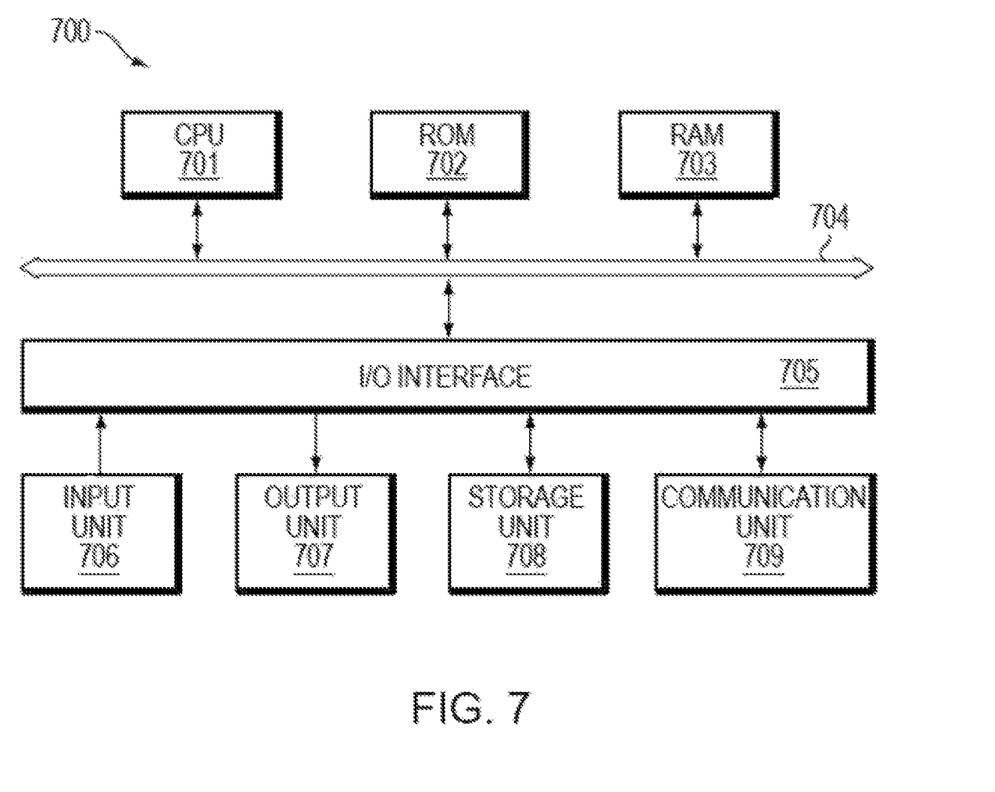
FIG. 7 illustrates a schematic block diagram of an example device that may be used to implement embodiments of the present disclosure.

FIG. 7 illustrates a schematic block diagram of an example device 700 that may be used to implement embodiments of the present disclosure. As shown in FIG. 7, the device 700 includes a central processing unit (CPU) 701, which may perform various appropriate actions and processes based on computer program instructions stored in a read-only memory (ROM) 702 or computer program instructions loaded from a storage unit 708 to a random access memory (RAM) 703. In RAM 703, there are also stored various programs and data required by the device 700 when operating. The CPU 701, ROM 702, and RAM 703 are connected to one another via a bus 704. An input/output (I/O) interface 705 is also connected to the bus 704.

A plurality of components of the device 700 are connected to the I/O interface 705: including: an input unit 706 comprising a keyboard, a mouse, and the like; an output unit 707, such as various types of displays, loudspeakers, and the like; a storage unit 708 including a magnetic disk, an optical disk, and the like; and a communication unit 709 including a LAN card, a modem, a wireless communication transceiver and so on. The communication unit 709 allows the device 700 to exchange information/data with other devices via a computer network, such as the Internet, and/or various telecommunications networks.

The above-described procedures and processes, such as the method 300, can be implemented by the processing unit 701. For example, in some embodiments, the method 300 can be implemented as a computer software program which is tangibly embodied on a machine readable medium, for instance, the storage unit 708. In some embodiments, part or all of the computer program can be loaded to and/or installed on the device 700 via the ROM 702 and/or the communication unit 709. The computer program, when loaded to the RAM 703 and executed by the CPU 701, may execute one or more acts of the method 300 as described above. Alternatively, the CPU 701 can also be configured to implement the method 300 as described above in any other proper manner (for example, by means of firmware).

The present disclosure provides a method for handling accumulated errors for a drive. When errors are detected in I/O operations for the drive, embodiments of the present disclosure count the errors per error type, so as to handle different error types with different methods.

In the mapped RAID architecture of the present disclosure, a logic space of a drive is divided into a plurality of extents or portions. The present disclosure proposes to process hard medium errors and soft medium errors separately in two different ways. For hard medium errors, error handling will be performed with respect to the entire drive. For soft medium errors, error handling will be performed only with respect to the drive extent that causes the errors. In this manner, the error handling based on the drive extent can prevent more drive errors from being exposed, and data duplication or reconstruction is started only for the drive extent that causes the errors rather than the entire drive. The drive extent that causes the errors can be duplicated or reconstructed very quickly and the number of required spare blocks can be reduced.

It can also lengthen the service life of the drive because the handled drive extent will not expose more errors which will consume more spare blocks reserved at the drive by the drive vendor.

In addition, a data error is also handled only with respect to the drive extent. However, if a data error occurs once, acts will be performed for the drive extent that causes the error without counting and accumulating data errors.

Embodiments of the present disclosure define the error ratio and the associated resetting/life/shutdown thresholds. Once the error ratio exceeds a corresponding threshold, corresponding acts are taken to repair the errors. On the other hand, if a drive works well after one error, the method of the present disclosure may decrease the error ratio. The error ratio will be decreased below the thresholds and finally come close to zero with I/O operations increased and served successfully.

The present disclosure may be a method, an apparatus, a system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for handling an error for a drive with a logic space divided into a plurality of extents, the method comprising:

in response to errors detected in I/O operations for the drive, determining a type of the errors;

in response to determining that the type of the errors is a soft medium error or a data error, determining a drive extent of the plurality of extents of the drive that causes the errors, the soft medium error being an error that can be repaired by re-mapping of a failed extent and the data error being an error that is caused by damage of data on the drive; and handling the errors only with respect to the drive extent that causes the errors;

wherein if the type of the errors is determined to be a soft medium error, handling the errors only with respect to the drive extent that causes the errors comprises:

counting a number of the errors and a number of the I/O operations, respectively;

calculating a ratio of the number of the errors to the number of the I/O operations; and handling the errors based on the ratio; and
wherein handling the errors based on the ratio comprises:
  comparing the ratio with a threshold,
    in response to the ratio being greater than a shutdown threshold, marking the drive extent as unavailable; and
    in response to the ratio being smaller than the shutdown threshold but greater than a life threshold, marking the drive extent as end of life.

2. The method according to claim 1, wherein handling the errors based on the ratio further comprises:
  in response to the drive extent being marked as end of life, duplicating data from the drive extent to a further drive extent, and replacing the drive extent with the further drive extent; or
  in response to the drive extent being marked as unavailable, reconstructing, on a further drive extent, data that is identical to data on the drive extent, and replacing the drive extent with the further drive extent.

3. The method according to claim 1, further comprising:
  in response to determining that a type of other errors is a hard medium error, handling the other errors with respect to an entirety of the drive, the hard medium error being an error that is caused by a hardware failure in the drive.

4. The method according to claim 3, wherein handling the other errors with respect to an entirety of the drive comprises:
  counting a number of the other errors and a number of the I/O operations, respectively;
  calculating a ratio of the number of the other errors to the number of the I/O operations; and
  handling the other errors based on the ratio.

5. The method according to claim 4, wherein handling the other errors based on the ratio comprises:
  comparing the ratio with a threshold,
  in response to the ratio being greater than a shutdown threshold, marking the drive as unavailable;
  in response to the ratio being smaller than the shutdown threshold but greater than a life threshold, marking the drive as end of life; and
  in response to the ratio being smaller than the life threshold but greater than a resetting threshold, resetting the drive.

6. The method according to claim 1, wherein counting the number of the errors is based on weights for the errors, the method further comprising:
  in response to bursts of the errors or in absence of an impact on a normal I/O operation for the drive by the errors, reducing the weights.

7. The method according to claim 1, further comprising:
  in response to determining that a type of other errors is a data error, handling the other errors only with respect to the drive extent that causes the other errors by marking the drive extent that causes the other errors as unavailable.

8. An electronic device, comprising:
at least one processing unit; and
at least one memory coupled to the at least one processing unit and storing instructions executable by the at least one processing unit, the instructions, when executed by the at least one processing unit, causing the electronic device to perform acts of:
  in response to errors detected in I/O operations for a drive, determining a type of the errors, wherein a logic space of the drive is divided into a plurality of extents;
  in response to determining that the type of the errors is a soft medium error or a data error, determining a drive extent of the plurality of extents of the drive that causes the errors, the soft medium error being an error that can be repaired by re-mapping of a failed extent and the data error being an error that is caused by damage of data on the drive; and
  handling the errors only with respect to the drive extent that causes the errors;
  wherein if the type of the errors is determined to be a soft medium error, handling the errors only with respect to the drive extent that causes the errors comprises:
    counting a number of the errors and a number of the I/O operations, respectively;
    calculating a ratio of the number of the errors to the number of the I/O operations; and
    handling the errors based on the ratio; and
  wherein handling the errors based on the ratio comprises:
    comparing the ratio with a threshold,
    in response to the ratio being greater than a shutdown threshold, marking the drive extent as unavailable; and
    in response to the ratio being smaller than the shutdown threshold but greater than a life threshold, marking the drive extent as end of life.

9. The electronic device according to claim 8, wherein handling the errors based on the ratio further comprises:
  in response to the drive extent being marked as end of life, duplicating data from the drive extent to a further drive extent, and replacing the drive extent with the further drive extent; or
  in response to the drive extent being marked as unavailable, reconstructing, on a further drive extent, data that is identical to data on the drive extent, and replacing the drive extent with the further drive extent.

10. The electronic device according to claim 8, wherein the instructions, when executed by the at least one processing unit, further cause the electronic device to perform an act of:
  in response to determining that a type of other errors is a hard medium error, handling the other errors with respect to an entirety of the drive, the hard medium error being an error that is caused by a hardware failure in the drive.

11. The electronic device according to claim 10, wherein handling the other errors with respect to an entirety of the drive comprises:
  counting a number of the other errors and a number of the I/O operations, respectively;
  calculating a ratio of the number of the other errors to the number of the I/O operations; and
  handling the other errors based on the ratio.

12. The electronic device according to claim 11, wherein handling the other errors based on the ratio comprises:
  comparing the ratio with a threshold,
  in response to the ratio being greater than a shutdown threshold, marking the drive as unavailable;
  in response to the ratio being smaller than the shutdown threshold but greater than a life threshold, marking the drive as end of life; and
  in response to the ratio being smaller than the life threshold but greater than a resetting threshold, resetting the drive.

13. The electronic device according to claim 8, wherein counting the number of the errors is based on weights for the errors, and the instructions, when executed by the at least one processing unit, further cause the electronic device to perform an act of:

in response to bursts of the errors or in absence of an impact on a normal I/O operation for the drive by the errors, reducing the weights.

14. The electronic device according to claim 8, wherein the instructions, when executed by the at least one processing unit, further cause the electronic device to perform an act of:

in response to determining that a type of other errors is determined to be a data error, handling the other errors only with respect to the drive extent that causes the errors by marking the drive extent that causes the other errors as unavailable.

15. A computer program product for handling an error for a drive with a logic space divided into a plurality of extents, the computer program product comprising:

a non-transitory computer readable medium encoded with computer-executable program code, the code configured to enable the execution of:

in response to errors detected in I/O operations for the drive, determining a type of the errors;

in response to determining that the type of the errors is a soft medium error or a data error, determining a drive extent of the plurality of extents of the drive that causes the errors, the soft medium error being an error that can be repaired by re-mapping of a failed extent and the data error being an error that is caused by damage of data on the drive; and handling the errors only with respect to the drive extent that causes the errors;

wherein if the type of the errors is determined to be a soft medium error, handling the errors only with respect to the drive extent that causes the errors comprises:

counting a number of the errors and a number of the I/O operations, respectively;

calculating a ratio of the number of the errors to the number of the I/O operations; and handling the errors based on the ratio; and wherein handling the errors based on the ratio comprises:

comparing the ratio with a threshold, in response to the ratio being greater than a shutdown threshold, marking the drive extent as unavailable; and in response to the ratio being smaller than the shutdown threshold but greater than a life threshold, marking the drive extent as end of life.

16. The computer program product of claim 15, wherein counting the number of the errors is based on weights for the errors; and wherein the code is further configured to enable the execution of:

in response to bursts of the errors or in absence of an impact on a normal I/O operation for the drive by the errors, reducing the weights.

17. The computer program product of claim 15, wherein in response to determining that a type of other errors is a data error, handling the other errors only with respect to the drive extent that causes the other errors by marking the drive extent that causes the other errors as unavailable.

18. A method for handling an error for a drive with a logic space divided into a plurality of extents, the method comprising:

in response to errors detected in I/O operations for the drive, determining a type of the errors;

in response to determining that the type of the errors is a soft medium error or a data error, determining a drive extent of the plurality of extents of the drive that causes the errors, the soft medium error being an error that can be repaired by re-mapping of a failed extent and the data error being an error that is caused by damage of data on the drive; and handling the errors only with respect to the drive extent that causes the errors;

wherein if the type of the errors is determined to be a soft medium error, handling the errors only with respect to the drive extent that causes the errors comprises:

counting a number of the errors and a number of the I/O operations, respectively;

calculating a ratio of the number of the errors to the number of the I/O operations; and handling the errors based on the ratio; and wherein counting the number of the errors is based on weights for the errors, the method further comprising:

in response to bursts of the errors or in absence of an impact on a normal I/O operation for the drive by the errors, reducing the weights.

19. A method for handling an error for a drive with a logic space divided into a plurality of extents, the method comprising:

in response to errors detected in I/O operations for the drive, determining a type of the errors;

in response to determining that the type of the errors is a soft medium error or a data error, determining a drive extent of the plurality of extents of the drive that causes the errors, the soft medium error being an error that can be repaired by re-mapping of a failed extent and the data error being an error that is caused by damage of data on the drive; and handling the errors only with respect to the drive extent that causes the errors;

wherein the method further comprises:

in response to determining that the type of the errors is a hard medium error, handling the errors with respect to an entirety of the drive, the hard medium error being an error that is caused by a hardware failure in the drive;

wherein handling the errors with respect to an entirety of the drive comprises:

counting a number of the errors and a number of the I/O operations, respectively;

calculating a ratio of the number of the errors to the number of the I/O operations; and handling the errors based on the ratio; and wherein handling the errors based on the ratio comprises:

comparing the ratio with a threshold, in response to the ratio being greater than a shutdown threshold, marking the drive as unavailable;

in response to the ratio being smaller than the shutdown threshold but greater than a life threshold, marking the drive as end of life; and in response to the ratio being smaller than the life threshold but greater than a resetting threshold, resetting the drive.

20. An electronic device, comprising:

at least one processing unit; and at least one memory coupled to the at least one processing unit and storing instructions executable by the at least one processing unit, the instructions, when executed by the at least one processing unit, causing the electronic device to perform acts of:

in response to errors detected in I/O operations for a drive, determining a type of the errors, wherein a logic space of the drive is divided into a plurality of extents;

in response to determining that the type of the errors is a soft medium error or a data error, determining a drive extent of the plurality of extents of the drive that causes the errors, the soft medium error being an error that can be repaired by re-mapping of a failed extent and the data error being an error that is caused by damage of data on the drive; and handling the errors only with respect to the drive extent that causes the errors;

wherein if the type of the errors is determined to be a soft medium error, handling the errors only with respect to the drive extent that causes the errors comprises:

counting a number of the errors and a number of the I/O operations, respectively;

calculating a ratio of the number of the errors to the number of the I/O operations; and handling the errors based on the ratio; and wherein counting the number of the errors is based on weights for the errors, and the instructions, when executed by the at least one processing unit, further cause the electronic device to perform an act of: in response to bursts of the errors or in absence of an impact on a normal I/O operation for the drive by the errors, reducing the weights.

21. An electronic device, comprising:

at least one processing unit; and at least one memory coupled to the at least one processing unit and storing instructions executable by the at least one processing unit, the instructions, when executed by the at least one processing unit, causing the electronic device to perform acts of:

in response to errors detected in I/O operations for a drive, determining a type of the errors, wherein a logic space of the drive is divided into a plurality of extents;

in response to determining that the type of the errors is a soft medium error or a data error, determining a drive extent of the plurality of extents of the drive that causes the errors, the soft medium error being an error that can be repaired by re-mapping of a failed extent and the data error being an error that is caused by damage of data on the drive; and handling the errors only with respect to the drive extent that causes the errors;

wherein the instructions, when executed by the at least one processing unit, further cause the electronic device to perform an act of:

in response to determining that the type of the errors is a hard medium error, handling the errors with respect to an entirety of the drive, the hard medium error being an error that is caused by a hardware failure in the drive;

wherein handling the errors with respect to an entirety of the drive comprises:

counting a number of the errors and a number of the I/O operations, respectively;

calculating a ratio of the number of the errors to the number of the I/O operations; and handling the errors based on the ratio; and wherein handling the errors based on the ratio comprises:

comparing the ratio with a threshold, in response to the ratio being greater than a shutdown threshold, marking the drive as unavailable;

in response to the ratio being smaller than the shutdown threshold but greater than a life threshold, marking the drive as end of life; and in response to the ratio being smaller than the life threshold but greater than a resetting threshold, resetting the drive.

* * * * *